United States Patent
Moss et al.

(10) Patent No.: US 10,935,103 B2
(45) Date of Patent: Mar. 2, 2021

(54) GRIPPING DEVICE

(71) Applicant: Doby Cleats Limited, Durham (GB)

(72) Inventors: Thomas Malcolm Moss, Durham (GB); Terence Raymond Dingley, Durham (GB)

(73) Assignee: Doby Cleats Limited, Durham (GB)

( * ) Notice: Subject to any disclaimer, the term of this patent is extended or adjusted under 35 U.S.C. 154(b) by 0 days.

(21) Appl. No.: 16/466,687

(22) PCT Filed: Nov. 1, 2017

(86) PCT No.: PCT/GB2017/053291
§ 371 (c)(1),
(2) Date: Jun. 5, 2019

(87) PCT Pub. No.: WO2018/104697
PCT Pub. Date: Jun. 14, 2018

(65) Prior Publication Data
US 2019/0301567 A1    Oct. 3, 2019

(30) Foreign Application Priority Data
Dec. 6, 2016    (GB) ...................................... 1620733

(51) Int. Cl.
*F16G 11/10*    (2006.01)

(52) U.S. Cl.
CPC .......... *F16G 11/106* (2013.01); *F16G 11/108* (2013.01)

(58) Field of Classification Search
CPC ... F16G 11/106; F16G 11/108; Y10T 24/3993
See application file for complete search history.

(56) References Cited

U.S. PATENT DOCUMENTS

| 5,147,145 | A | * | 9/1992 | Facey | F16G 11/108 24/136 A |
| 6,003,210 | A | * | 12/1999 | Facey | F16G 11/14 24/130 |
| 8,578,566 | B2 | * | 11/2013 | Jolly | F16G 11/106 24/136 R |
| 2012/0110791 | A1 | * | 5/2012 | Giemza | F16G 11/106 24/136 R |

FOREIGN PATENT DOCUMENTS

| GB | 2378213 A | * | 2/2003 | ............ A01K 3/005 |
| GB | 2524964 A | * | 10/2015 | ............ F16G 11/108 |

* cited by examiner

*Primary Examiner* — Robert Sandy
(74) *Attorney, Agent, or Firm* — Culhane Meadows PLLC; Robert Klinger

(57) ABSTRACT

A gripping device comprises: at least two end walls located at opposing ends of the device; at least one elongate channel for receiving an elongate element, the longitudinal axis of the or each channel extending between the two end walls; a gripping element; and biasing means for bringing the gripping element into engagement with an elongate element located in the said channel. The gripping element is mounted for translational movement in a slot. A force component exerted on an elongate element located in the said channel causes the gripping element to move in the slot at towards the elongate element. Each end wall includes at least one hole therethrough, a first hole for receipt of an elongate element into the said channel and a second hole for exit of said elongate element from said channel.

16 Claims, 8 Drawing Sheets

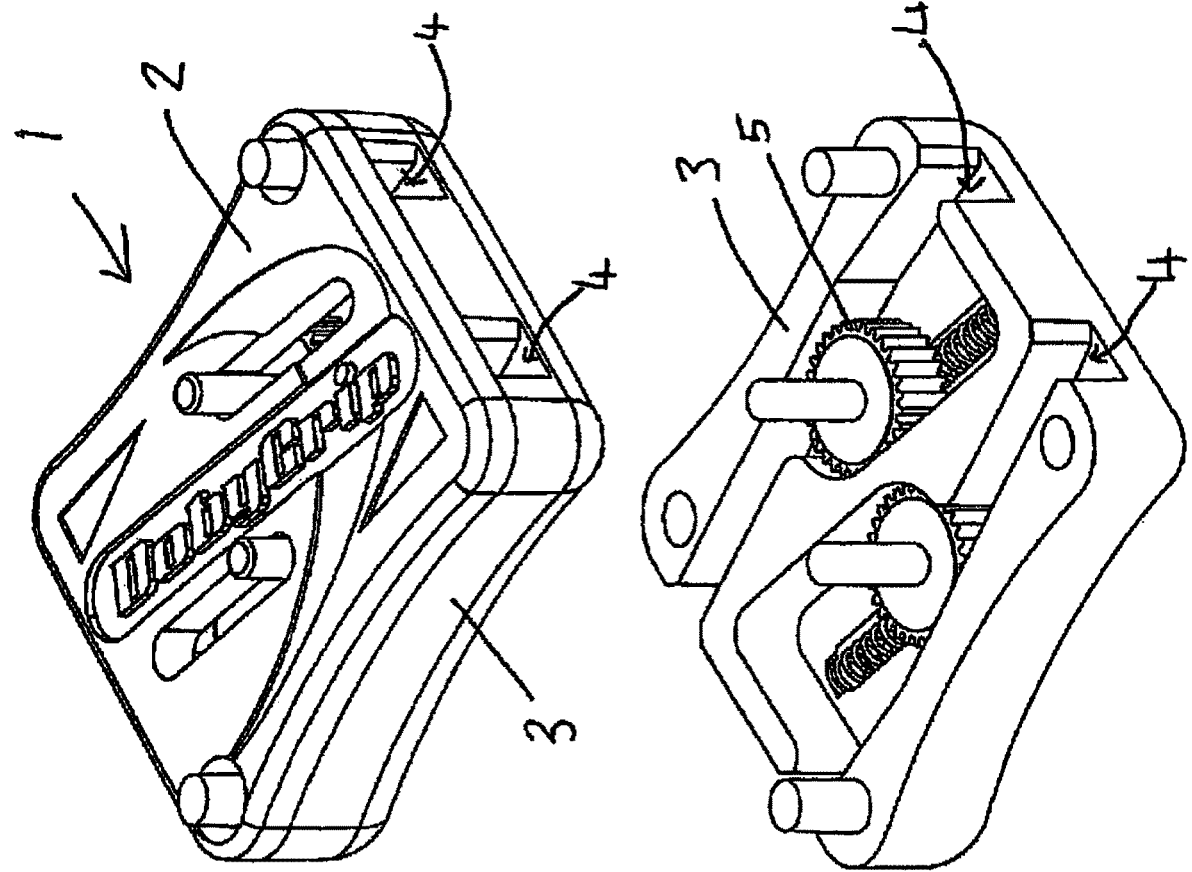

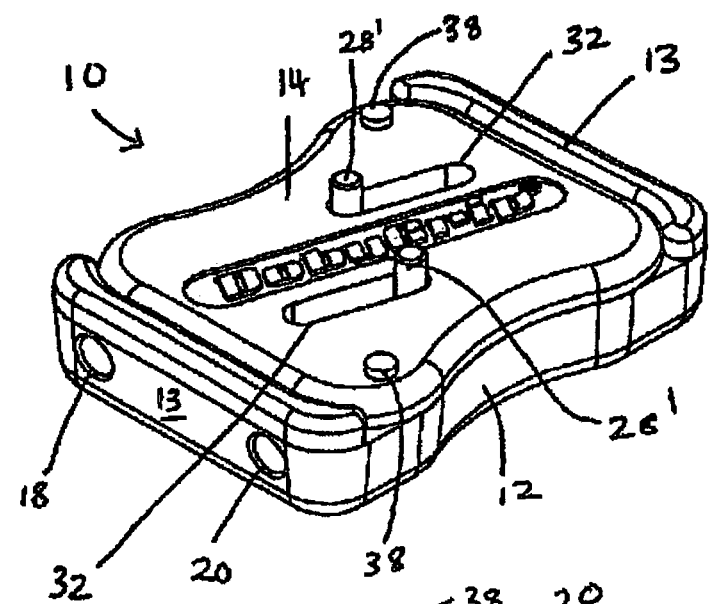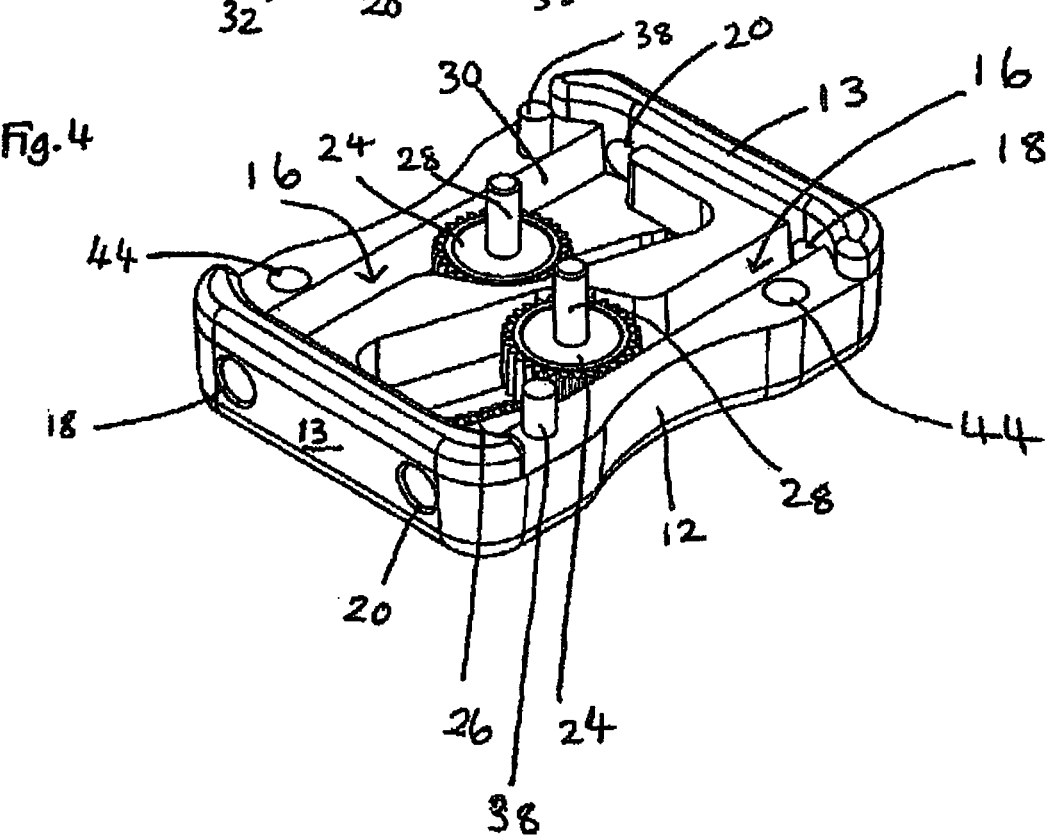

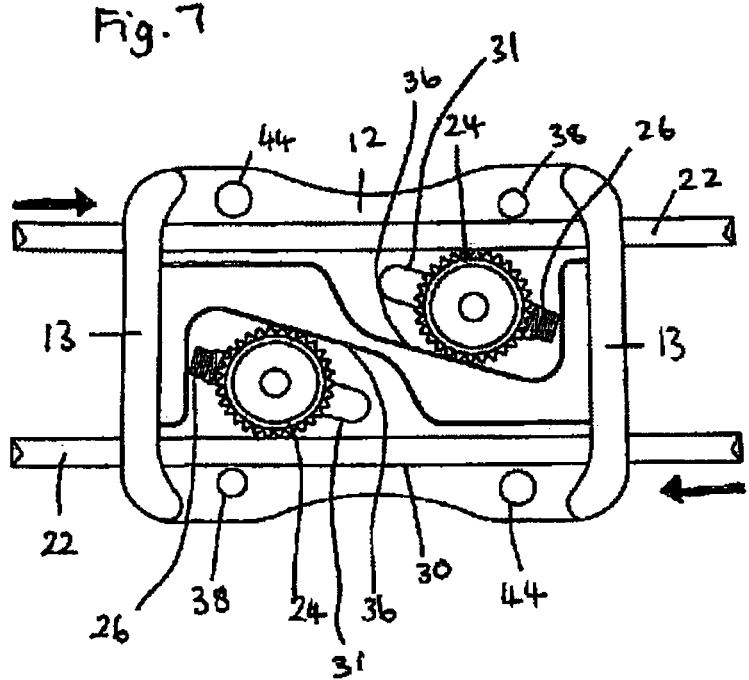
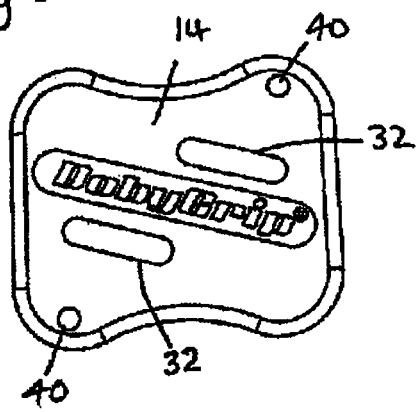
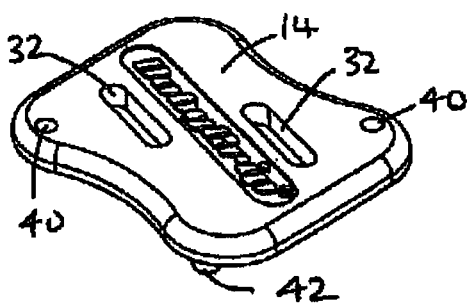

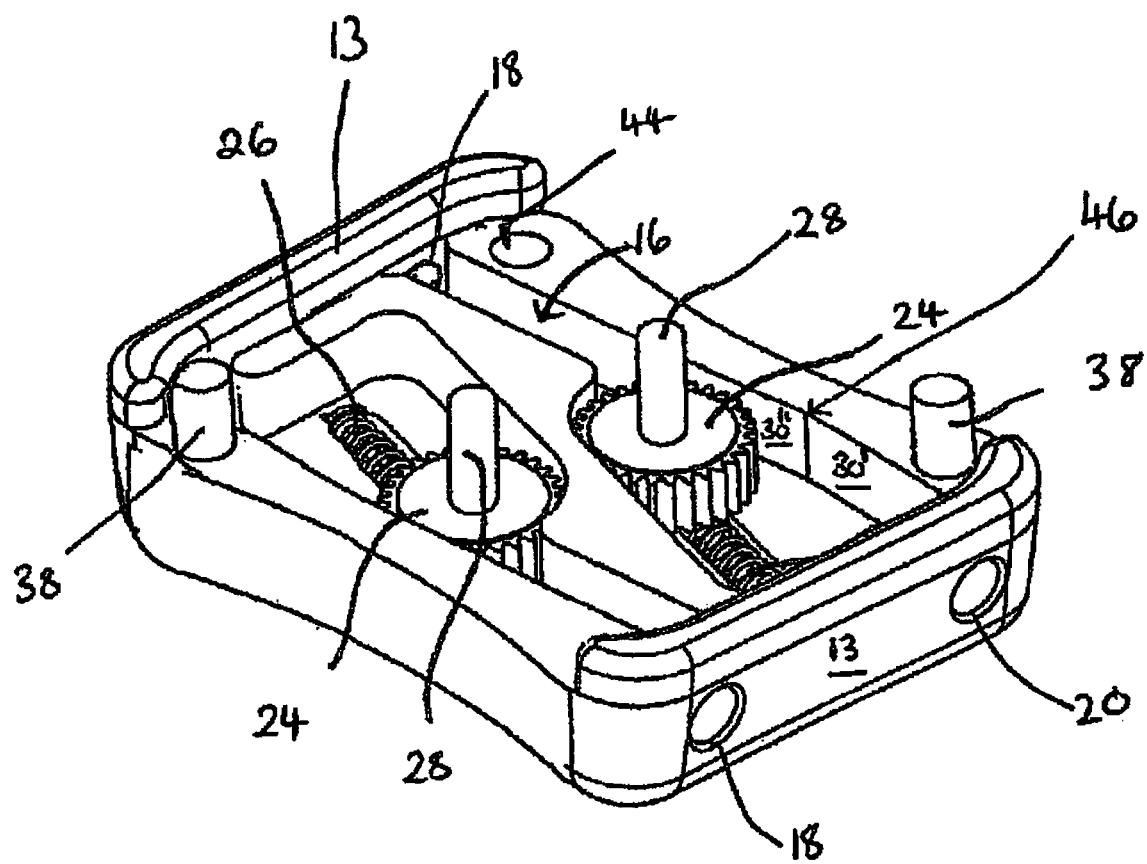

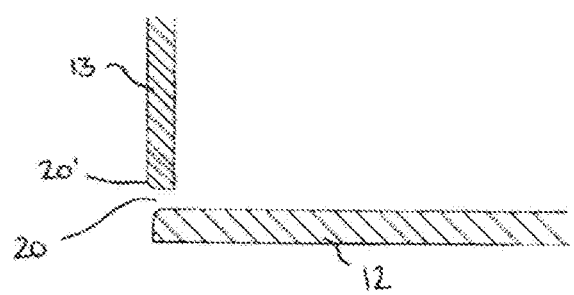
FIGURE 11a
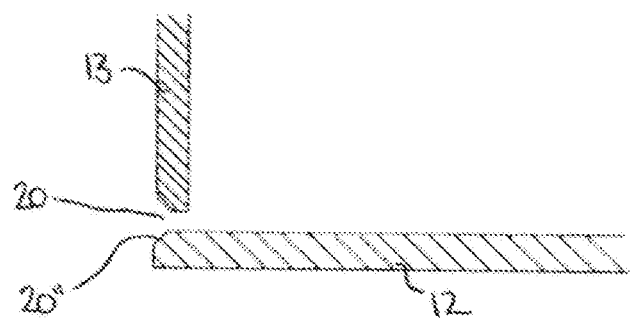
FIGURE 11b
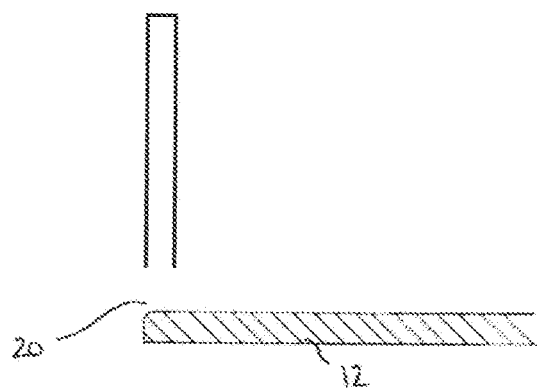
FIGURE 11c
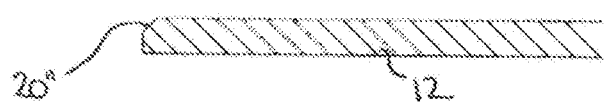
FIGURE 11d

GRIPPING DEVICE

FIELD OF THE INVENTION

The present invention relates to a gripping device, and in particular to a device for gripping an elongate strand of material such as a wire.

BACKGROUND OF THE INVENTION

Gripping devices are used in many applications. For example, joining together wire strands in fencing applications, to suspend an object from a wire, to suspend sports equipment, or to suspend objects from structural elements of a building.

Gripping devices are known from GB2430234 and GB2524964.

A limitation associated with the known gripping devices, such as the DOBYGRIP™ is that the suspension wire must not be more than 60 degrees from the vertical as shown in FIG. 1a, and when one gripping device 1 is used to support an object, as shown in FIGS. 1b and 1c, the inclusive angle A must not be greater than 60 degrees. This can cause problems when suspending objects since the object must be positioned a certain minimum distance X from the gripping device 1.

Another limitation associated with the known gripping devices is that the load that can be supported reduces as the suspension wire vertical angle increases. For example at the maximum angle of 60 degrees to the vertical the safe working load that can be supported is typically reduced by 50%.

Prior art devices comprise a body 3 and a top plate 2 as shown in FIGS. 2a and 2b. In the prior art device 1 the square shaped aperture 4 for receiving a wire is formed by a three sided u-shaped channel in the body portion 3 of the device, which is then closed by securing the top plate 2 to the body 3. If the suspension wire is at an angle of more than 60 degrees to the vertical then the internal strain can cause the wire to be pulled away from the gear wheel 5 and can cause top plate 2 to be ripped away from the body 3, causing the device to fail.

Gripping devices are also described in EP1967759 and US20130200637. In these devices the wire is surrounded in part by a slot formed in the fitting which mounts the roller which engages the wire and in part by the outer casing of the device. As with the prior art devices described above, when the wires extend from the device at a wide angle forces are placed on the device which can pull apart the components thereof.

There is a demand to use the types of gripping device described above with larger angles for areas where there is little suspension height available. It would therefore be desirable to provide such a gripping device.

SUMMARY OF THE INVENTION

According to the invention there is provided a gripping device comprising:

at least two end walls located at opposing ends of the device;

at least one elongate channel for receiving an elongate element, the or each elongate channel having a longitudinal element and the longitudinal axis of the or each channel extending between the two end walls;

a gripping element; and biasing means for bringing the gripping element into engagement with an elongate element located in the said channel;

wherein the gripping element is mounted for translational movement in a slot having a longitudinal axis, and the longitudinal axis of the slot is set at an acute angle to the longitudinal axis of the channel;

wherein a force component exerted on an elongate element located in the said channel causes the gripping element to move in the slot towards the elongate element;

and wherein each end wall includes at least one hole therethrough, a first hole for receipt of an elongate element into the said channel and a second hole for exit of said elongate element from said channel.

Preferably, the channel is defined by channel walls and the channel wall opposing the gripping element is substantially straight. In use, an elongate element located in the said channel is gripped between the gripping element and the substantially straight opposing channel wall of the channel.

Alternatively, the channel is defined by channel walls and the channel wall opposing the gripping element includes two intersecting surfaces lying at an angle to one another, the angle between the two surfaced being concave. Preferably the angle between the two surfaces lies in the range 160 to 179 degrees.

The holes may be substantially cylindrical in shape.

Preferably, the diameter of each hole is not more than 3 mm larger than the diameter of the elongate element to be inserted therein.

Preferably, each end wall has an inner surface and an outer surface and wherein the continuous wall of each hole has at least one radiused or chamfered edge, one of the at least one radiused or chamfered edge being situated between the continuous wall of the hole through the end wall and the outer surface of the end wall in which the hole is situated.

The continuous wall of each hole may have two radiused or chamfered edges, the second of the two radiuses or chamfered edges being situated between the continuous wall of the hole through the end wall and the inner surface of the end wall in which the hole is situated.

The gripping element is preferably a pinion wheel. Preferably, the pinion wheel is one of: smooth, toothed and roughened.

Preferably, the track is one of: smooth, roughened and toothed.

The gripping device may further comprise biasing means arranged to bias the pinion into the path of the elongate opening.

The biasing means may be a spring, which spring may be a compression spring. The gripping device may further comprise means for manual adjustment of the gripping means.

The gripping device may comprise a body and and wherein the top plate is attachable to the body.

Preferably, the body is formed of metal.

Preferably, the body is formed by casting or moulding. The holes in the end walls may be formed by drilling. The body could be machined from a workpiece of suitable material, such as a metal.

The gripping device of the invention provides an advantage over the prior art in that it can be used with inclusive angles of greater than 60 degrees. This allows items to be suspended much closer to the gripping device which is particularly useful in areas where space is limited.

BRIEF DESCRIPTION OF THE DRAWINGS

In the drawings, which illustrate both prior art devices, and a preferred embodiment of the invention, and are by way of example:

FIG. 2a is a perspective view of a prior art gripping device;

FIG. 2b is a perspective view of the body portion of the prior art gripping device of FIG. 2a;

FIG. 3 is a perspective view of a gripping device according to an embodiment of the invention;

FIG. 4 is a perspective view of the body portion of the gripping device of FIG. 3;

FIG. 7 is a plan view of the body portion of the gripping device of FIG. 4, gripping a wire;

FIG. 8a is a plan view of the top plate of the gripping device of FIG. 3;

FIG. 8b is a perspective view of the top plate of FIG. 8a;

FIG. 9 is a perspective view of a body portion of a gripping device according to a second embodiment of the invention;

FIG. 11a is a cross-section through an end wall of the body portion of one embodiment of a gripping device of the invention;

FIG. 11b is cross-section through an end wall of the body portion of another embodiment of a gripping device of the invention;

FIG. 11c is a cress-section through an end wall of the body portion of another embodiment of a gripping device of the invention; and FIG. 11d is a cross-section through an end wall of the body portion of another embodiment of a gripping device of the invention.

DETAILED DESCRIPTION OF THE PREFERRED EMBODIMENTS

Figure 1C:
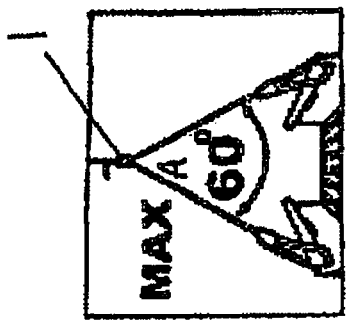
FIGS. 1a, b and c illustrate prior art gripping devices in use.
Figure 1B:
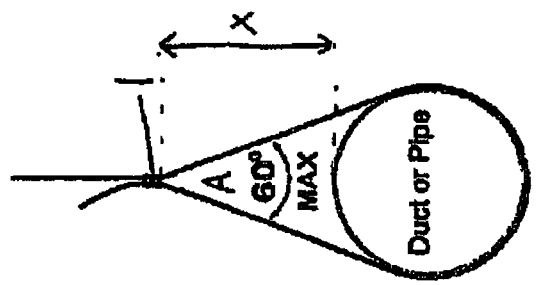
Figure 1A:
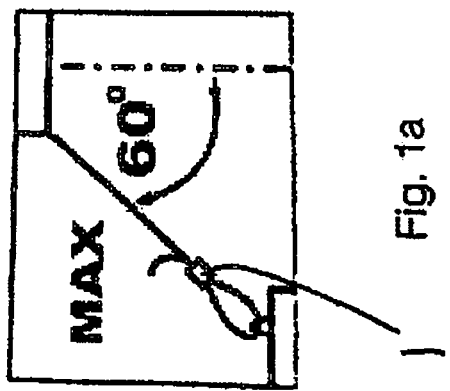
Figure 5:
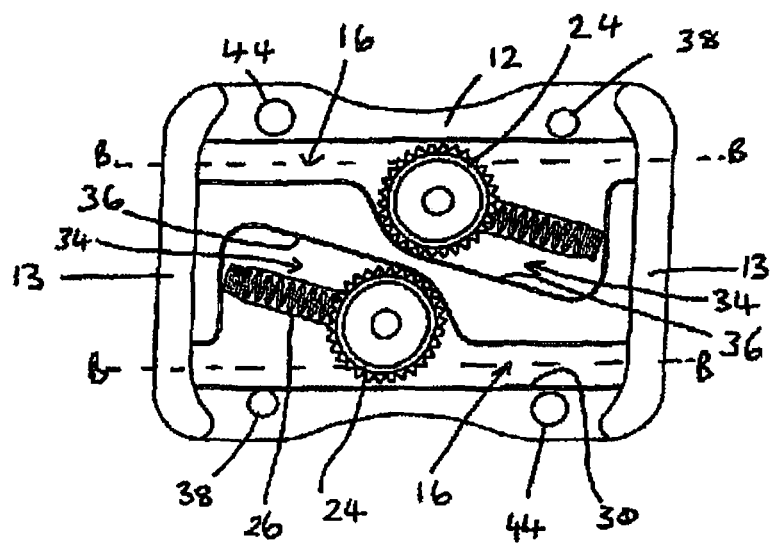
FIG. 5 is a plan view of the body portion of the gripping device of FIG. 4.
Figure 6A:
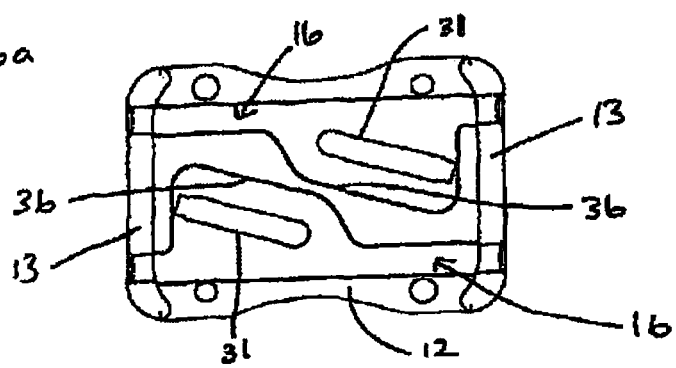
FIG. 6a is a plan view of the body portion of the gripping device of FIG. 4, with the pinion wheel removed.
Figure 6B:
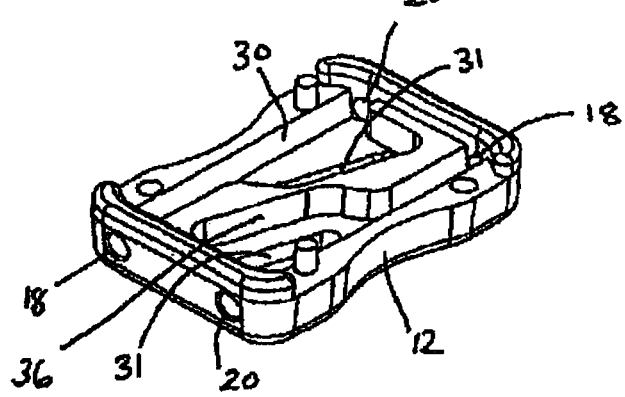
FIG. 6b is a perspective view of the body portion of the gripping device of FIG. 4, with the pinion wheel removed.

Referring now to FIGS. 3 to 8b, the gripping device 10 of the invention comprises a body 12 and a top cover or plate 14. The body 12 includes a pair of channels 16 that extend through the body 12 from one side of the device to the other. The body 12 includes two solid end walls 13, and the longitudinal axis (B-B, FIG. 5) of each channel 16 extends between the two end walls 13. Each of the end walls 13 have holes 18, 20 therethrough to allow access to the channels 16 through the walls 13. A first hole 18 is for receiving an elongate element such as a wire 22 (as shown in FIG. 7) and a second hole 20 for where the wire 22 exits the device 10. As shown in the drawings, the holes 18, 20 in the end walls are positioned within the wall such that the only access to the channels 16 is through the holes in the end walls.

Each channel 16 has one substantially straight wall 30. The opposite side of the channel 16 includes a recess 34 which accommodates a gripping element in the form of a toothed pinion wheel 24 and a track 36. The pinion wheel 24 is mounted on a pin 28 having an upper end 28' and a lower end (not visible in the drawings).

The body 12 is provided with a shaped cavity 31, in which the lower end of the pin 28 locates. The upper end 28' of the pin 28 extends through a slot 32 in the top plate 14, the shape of the slot 32 corresponds to the shape of the cavity 31. The extension of the upper end 28' of the pin 28 through the slot 32 in the top cover 14 provides a means by which the position of the pinion wheel 24 may be manually adjusted. The slot 32 and cavity 31 are positioned and oriented such that the teeth of the pinion wheel 24 engage with the track 36 of the recess 34. The ends of the slot 32 and cavity 31 define the extreme positions of the pinion wheel and the shape of the slot 32 and the cavity 31 define a path in which the pin 28 travels. The slot 32 and cavity 31 lie substantially parallel with the track 36, which is set at an acute angle to the longitudinal axis B-B of the channel 16.

As shown in FIG. 7 the end of the wire 22 is pushed into the body 13 of the device through the hole 18. In the direction of the arrow. The wire 22 then pushes the pinion wheel 24 so that it travels along the path of the slot 32 and cavity 31, thereby allowing space for the wire to pass the pinion wheel 24 and exit through the opening 20. When the wire 22 is pulled in the opposite direction, the spring 26 pushes the pinion wheel 24 against the surface of the wire 22 so that the teeth of the pinion wheel 24 grip the surface of the wire 22 causing the wire to abut firmly against the channel wall 30. The diameter of the wire is preferably matched to the diameter of the holes 18, 20 so that the hole 18, 20 is typically not more than 3 mm larger than the diameter of the wire 22.

The body includes location pins 38 which align with holes 40 in the top cover 14. As shown in FIG. 8b, the underside of the top cover 14 includes two location pins 42 which align with holes 44 in the body 12. The location pins 38, 42 are a press fit into the holes 40, 44.

As can be seen in FIG. 4, the holes 18, 20 are preferably aligned with the channel wall 30, such that the wire 22 remains aligned with the wall 30 as it exits the device 10. In this example the holes 18, 20 are not shaped or chamfered, however chamfered or radiused holes may be used to assist insertion of a wire and to provide other advantages as descried below with reference to FIGS. 11a and 11b. The channel wall need not be completely straight as illustrated in the embodiment of FIG. 9. In this embodiment the channel wall 30 with which a wire is aligned includes a slight bend indicated at 46. The bend 46 is preferably adjacent to the pinion wheel 24. In this embodiment the channel wall is made up of two surfaces 30' and 30" which intersect and lie at an angle to one another, preferably between 160 and 179 degrees.

The track 36 may be smooth, roughened or toothed. In the illustrated embodiments, the track 36 is smooth.

In this example both the body and top plate are made from a cast metal, such as a zinc aluminium alloy. Alternatively, the device may be machined from a solid block of metal. Although the device is described as being formed as a two piece unit it may also be formed as a single-bodied device.

FIG. 11a illustrates an example of the gripping device 10 where the junction between the outer surface of the end wall 13 and the surface of the hole 20 formed in the wall is formed by a radius 20. Only hole 20 is illustrated, but the hole 18 in the same end wall 13 would be formed similarly with a radius 20'. The holes 18, 20 in the end walls 13 at each end of the gripping device 10 may be provided with radiuses 20', however the radiuses 20' are most important at the end of the gripping device proximate the item that is to be suspended since it is from this end that the wires extend at a large included angle.

In FIG. 11b the radius 11' is replaced by a chamfered edge 20". This is preferably to an vertex. A vertex exerts a load on the wire at a single point, whereas chamfered edge 20" spreads the load over two points on the wire. Conversely, a radius spreads the load over the surface of the radius. The radiused edge 20' is preferred for this reason.

Figure 10:
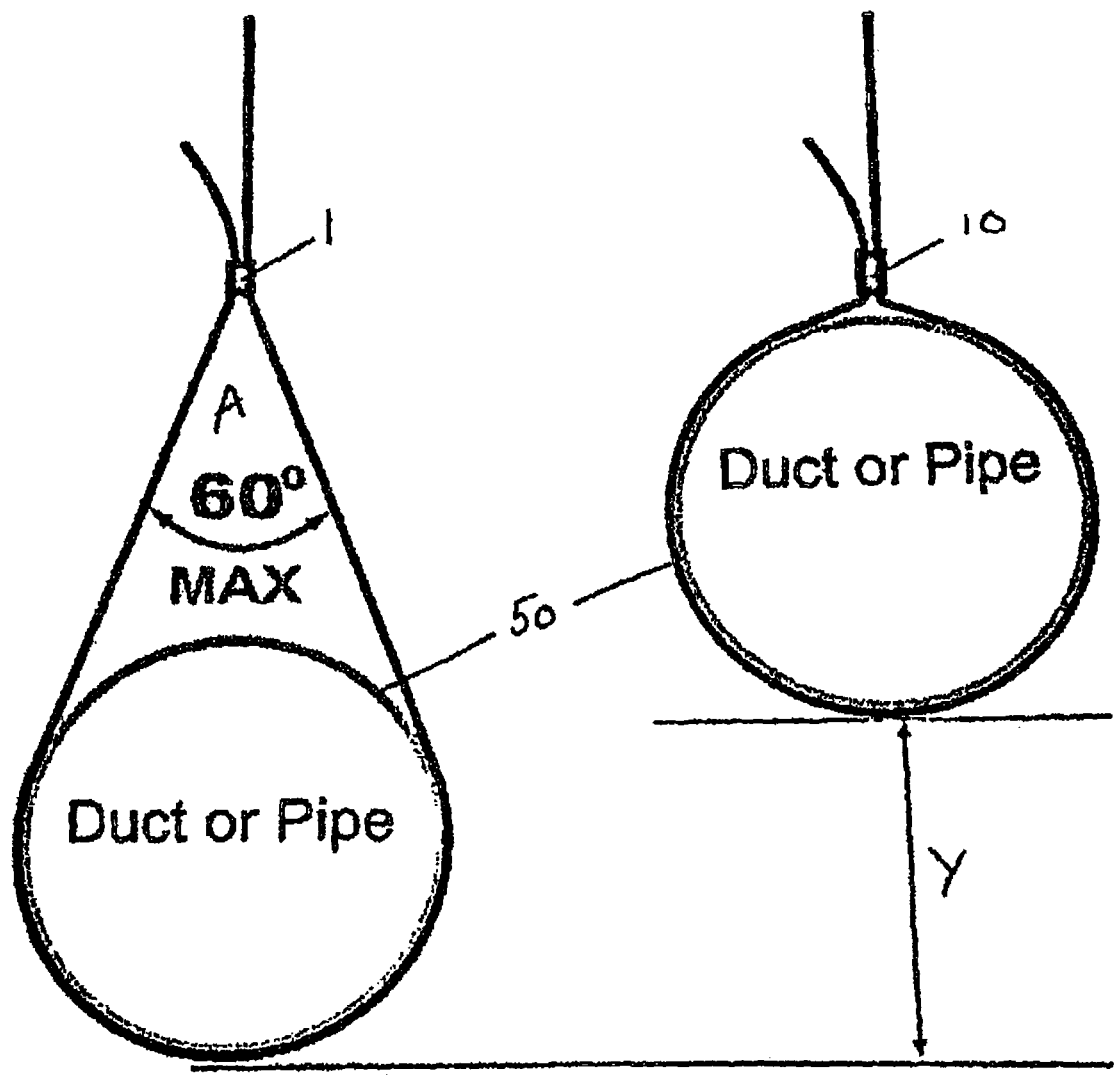
FIG. 10 illustrates use of a gripping device of the invention in suspending a duct, compared with a prior art gripping device used to suspend the same duct.

By forming the body 12 of the gripping device 10 with solid end walls with holes 18, 20 therein to access the channels 16 it is possible for a suspension wire to be used at a much greater angles as shown in FIG. 10. Since the wire 22 is held in place within the solid end wall 13 the device does not fail at larger inclusive angles. As shown in FIG. 10, using the gripping device of the invention 10, a duct or pipe 50 can be raised a distance Y when compared to use of a prior art griping device 1 in which a maximum inclusive angle of 60 degrees is required. This is particularly useful in situations where space is of a premium.

The invention claimed is:

1. A gripping device comprising:
   a body having first and second ends and including two spaced apart end walls, one end wall located at the first end of the body and the other end wall located at the second end of the body;
   wherein the body includes at least one elongate channel for receiving an elongate element, the or each elongate channel having a longitudinal axis and the longitudinal axis of the or each channel extending between the two end walls;
   a gripping element; and
   biasing means for bringing the gripping element into engagement with an elongate element located in the said channel;
   wherein the gripping element s mounted for translational movement in a slot formed in the body, the slot having a longitudinal axis, and the longitudinal axis of the slot is set at an acute angle to the longitudinal axis of the channel;
   wherein a force component exerted on an elongate element located in the said channel causes the gripping element to move in the slot towards the elongate element;
   and wherein each said end wall includes at least one hole therethrough aligned with one of the elongate channels, a first hole for receipt of an elongate element into die said channel and a second hole for exit of said elongate element from said channel, and wherein each hole is defined by a Continuous wall.

2. A gripping device according to claim 1, wherein the channel is defined by channel walls and wherein the channel wall opposing the gripping element is substantially straight and wherein, in use, an elongate element located in the said channel is gripped between the gripping element and the substantially straight opposing channel wall of the channel.

3. A gripping device according to claim 1, wherein the channel is defined by channel walls and wherein the channel wall opposing the gripping element includes two intersecting surfaces lying at an angle to one another, the angle between the two surfaces being concave.

4. A gripping device according to claim 3, wherein the angle between the two surfaces lies in the range 160 to 179 degrees.

5. A gripping device according to claim 1, wherein the holes an substantially circular in cross section providing a cylindrical shape.

6. A gripping device according to claim 1, wherein the diameter of each hole is not more than 3 mm larger than the diameter of the elongate element to be inserted therein.

7. A gripping device according to claim 1, wherein each end wall has an inner surface and an outer surface and wherein the continuous wall of each hole has at least one radiused or chamfered edge being situated between the continuous wall of each hole and the outer surface of the end wall in which each hole is situated.

8. A gripping device according to claim 7, wherein the continuous wall of each hole has two radiused or chamfered edges, the second of the two radiuses or chamfered edges being situated between the continuous wall of each hole and the inner surface of the end wall in which each hole is situated.

9. A gripping device according to claim 1, wherein the gripping element is a pinion wheel.

10. A gripping device according to claim 9, wherein the pinion wheel is one of: smooth, toothed and roughened.

11. A gripping de vice according to claim 9, wherein a surface of the channel provides a track, the pinion wheel engaging with the track.

12. A gripping device according to claim 11, wherein the track is one of: smooth, roughened and toothed.

13. A gripping device according to claim 1, wherein the biasing means is a spring.

14. A gripping device according to claim 13, wherein the spring is a compression spring.

15. A gripping device according claim 1, further comprising means for manual adjustment of the gripping element.

16. A gripping device according to claim 1, wherein the device comprises a top plate and wherein the top plate is attachable to the body.

\* \* \* \* \*